(12) United States Patent
Xu et al.

(10) Patent No.: US 9,744,393 B1
(45) Date of Patent: Aug. 29, 2017

(54) METHOD OF REMOVING TOXINS FROM FLY ASH

(71) Applicants: YouTian Xu, Guangzhou (CN); Man Hung Chun, Hong Kong (CN); Jun Xu, Canton (CN); Terrance Kenny, Vancouver (CA)

(72) Inventors: YouTian Xu, Guangzhou (CN); Man Hung Chun, Hong Kong (CN); Jun Xu, Canton (CN); Terrance Kenny, Vancouver (CA)

(73) Assignee: Guangdong Decheng Environmental Sci-Tech Co., Ltd., Guangzhou (CN)

( * ) Notice: Subject to any disclaimer, the term of this patent is extended or adjusted under 35 U.S.C. 154(b) by 0 days.

(21) Appl. No.: 15/382,715

(22) Filed: Dec. 18, 2016

(51) Int. Cl.
*A62D 3/40* (2007.01)
*C04B 18/08* (2006.01)
*A62D 101/08* (2007.01)
*A62D 101/28* (2007.01)

(52) U.S. Cl.
CPC ............... *A62D 3/40* (2013.01); *C04B 18/08* (2013.01); *A62D 2101/08* (2013.01); *A62D 2101/28* (2013.01)

(58) Field of Classification Search
CPC .. A62D 3/40; A62D 2101/08; A62D 2101/28; C04B 18/08

USPC ......................................................... 588/404
See application file for complete search history.

(56) References Cited

FOREIGN PATENT DOCUMENTS

| CN | 1541968 | 11/2004 |
|---|---|---|
| CN | 01050076 | 10/2007 |
| CN | 101462835 | 6/2009 |
| CN | 01531492 | 9/2009 |
| CN | 101569890 | 11/2009 |
| CN | 101773924 A | 7/2010 |
| CN | 102000443 A | 4/2011 |
| CN | 102772978 A | 11/2012 |

*Primary Examiner* — Edward Johnson
(74) *Attorney, Agent, or Firm* — Thomas I. Rozsa

(57) ABSTRACT

A method for disposing of fly ash. After the fly ash has been processed using the method contained herein, this fly ash can be disposed of more easily because of the reduced toxicity of the final product. Also, this converted fly ash may be recycled and used as a material or aggregate in concrete. The method includes the treatment of dioxins found in fly ash found in waste incinerator flue from waste incineration power plants which includes collecting the fly ash, putting the fly ash into a hermetic device and treating the fly ash through various heating steps and thereafter lowering an environmental temperature in the hermetic heating device, which results in a significant reduction of dioxins in the fly ash.

3 Claims, No Drawings

METHOD OF REMOVING TOXINS FROM FLY ASH

BACKGROUND OF THE INVENTION

1. Field of the Invention

The present invention relates to the field of fly ash disposal. Specifically, this invention relates to a method for removing the toxicity within fly ash prior to disposal or in the alternative recycling the processed fly ash into a useable product.

2. Description of the Prior Art

The following published patent applications are the closest prior art known to the inventor:

1. Title: A fly ash disposal method
Patent Publication No: CN102772978A
Applicants: Jun Xu, Wei Zeng
Inventor: Jun Xu
Filing Date:: 2012-7-6
Date of Publication: 2012-11-14
Abstract: This invention reveals a disposal method of fly ash, as shown in the following steps: Collect fly ash from the incinerator flues of waste incineration power plants; place the fly ash in an air-free pressure-tight vacuum heating device or in a pressure-tight device with protective atmosphere for fully heating; transport the exhaust gas generated during the heating based on the prior step into a power plant boiler through pipe. The disposal method in this invention is able to dramatically lower the dioxins level in the fly ash, which will greatly reduce the damage of dioxins to the environment and human body.

2. Title: A new fly ash disposal method
Patent Publication No: CN101569890
Applicant: Beijing Xinbeishui Cement Co., Ltd.
Inventors: Yungui Xiong, Ji Zhang, Jinshan Cai
Filing Date:: 2009-5-25 Date of Publication: 2009-11-4
Abstract: This invention refers to a new fly ash disposal method, as shown in the following steps: After a road tanker enters into a factory, the vacuum pressure carried along with the road tanker it will punch fly ash into ash storage bin. A metering device controls the amount of fly ash fed into the storage bin. Then fly ash is moved into a pneumatic conveyance bin. Then the fly ash in the conveyance bin is pneumatically Then the fly ash is pneumatically transported to burner or spray gun device at kiln hood, and injected into rotary kiln through burner or spray gun device for incineration. Heavy metals in fly ash will be solidified into cement and will not be precipitated out. Fly ash contains acute toxic and hazardous dioxins that can be completely decomposed into water, carbon dioxide and other substances in a kiln under high temperature. The advantages of this invention are: Ejection point is set in kiln and can effectively solve the problem of harmless treatment of acute toxic and hazardous dioxins in fly ash; heavy metals in fly ash are solidified by cement and will not be precipitated out; at last, these heavy metals enter into cement products, i.e., waste is turned into resource, without secondary pollution; its process is novel, unique, simple and practical; the process is continuous, automatic, safe and reliable.

3. Title: Method of collecting dioxins in flue gas from household waste incineration
Patent Publication No: CN102000443A
Applicant: Tianjin University
Inventors: Hongting Ma, Jinglong Sun, Guoli Yang, Fangchao Wang, Sufeng Hao, Minghui Wang, Dan Du.
Filing Date:: 2010-11-5 Date of Publication: 2011-4-6
Abstract: This invention reveals a method of collecting dioxins in flue gas from household waste incineration, as shown in the following steps: Enable the flue gas produced by household waste incineration to pass through the first level casing heat exchanger cartridge, and through at least a first-level post-processing casing heat exchanger in sequence; the flue gas that has flowed out of the last level treatment casing heat exchanger sequentially passes through a hexane gas washing bottle, a buffer bottle, a glass fill tube, a toluene gas washing bottle and a buffer bottle placed in ice water mixture; using a toluene solution of a gas washing bottle for cleaning the inner wall of the heat exchange casing of the first level casing heat exchanger and collect toluene solution after washing; set a collection bottle at the bottom of the first level post-treatment casing heat exchanger to receive the condensation water of substances containing dioxins due to condensation of flue gas, and take cartridge, condensation water, resin, and toluene used to clear the inner wall of the first level casing heat exchanger as final samples. This method enhances the enrichment efficiency of dioxins, so as to monitor dioxins in the household waste incineration tail gas in a more accurate way.

4. Title: A harmless treatment method and device for waste incinerator fly ash
Patent Publication No: CN101462835
Applicants: Shanghai Solid Waste Disposal Center; Shanghai University; Shanghai Chengtou Environment Industry Development Company Limited
Inventors: Qifang Wu, Guangren Qian, Min Pu, Luquan Zhou, Zhengfei Tang, Xisheng Wang
Filing Date:: 2008-9-1 Date of Publication: 2009-6-24
Abstract: This invention reveals a harmless treatment method of waste incineration of fly ash and involves: Prewetting; slurrying—mixing of fly ash and water in the ratio of 1:2 to 1:20 and stirring the mixture for making mortar; rinsing and settling fly ash to dissolve soluble salt in it; agent modification; concentration—enabling mortar's moisture content to drop to 70% to 90%; dehydration—enabling mortar's moisture content to drop to a value below 35%; water treatment—charging $CO_2$ or acid to enable strong alkaline supernatant (pH value up to 11-12) to change into neutral water (pH value 6.0-8.5); add flocculant to capture micro particles and speed up the precipitation process; preparing cement—Add finished products of fly ash into cement rotary kiln and heat them to 1,000 C to 1,450 C, so that they can be decomposed into dioxins and suppress their generation under low temperature; enhance boiling points of heavy metals and passivate volatilization performance.

5. Title: A cooperative and pretreatment method with cement kiln for household waste incinerator fly ash of backflow leachate
Patent Publication No: CN101773924A
Applicants: Tsinghua University Inventor: Yiying Jin, Junli Zhang, Yongsheng Ling, Huan Li, Lei Wang, Yongfeng Nie
Filing Date:: 2010-1-29 Date of Publication: 2010-7-14
Abstract: This invention reveals a cooperative and pretreatment method with cement kiln for household waste incinerator fly ash of backflow leachate in solid waste treatment and disposal technology fields. The method comprises four stages, respectively rinsing and dechlorination of fly ash, washing water treatment, dehydration of ash by rinsing and in-kiln calcination. Remove chlorine of fly ash by rinsing, chelate and make coagulative sedimentation for heavy metals rinsed out, and allow them to enter into kiln with water-washed fly ash after filter pressing. Neutralize the eluate and allow heavy metals to settle, so as to ensure that washing water can meet discharging standards. Using the invention for fly ash disposal can not only save industrial raw materials of cement, but also effectively cure heavy metals, thoroughly burn dioxins, safely, economically and conveniently dispose of fly ash, and greatly enhance environmental benefit, economic benefit and social benefit. This invention saves land, water and investment and works stably, so as to ensure stable effects of processing water-washed fly ash and eluate; this will not produce secondary pollution.

6. Title: A method of preparing lightweight concrete by using household waste incinerator fly ash
Patent Publication No: CNO1531492
Applicant: Shanghai Institute of Technology
Inventors: Haiying Zhang, Youcai Zhao, Jingyu Qi, Shi Xu
Filing Date:: 2009-4-17 Date of Publication: 2009-9-16
Abstract: This invention reveals a method of preparing lightweight concrete with household waste incinerator fly ash. Matching ratios of materials of various components of the lightweight concrete are as follows: Waste incinerator fly ash 330-370 kg/m3; 525# common silicate cement 450-475 kg/m3; water-granulated slag 325-340 kg/m3; common clay ceramsite 350-370 kg/m3; crushed diabase 230-240 kg/m3; additive 2.7-2.9 kg/m3. This invention helps people to use household waste incinerator fly ash for preparing lightweight concrete and to solidify heavy metals in fly ash, thus achieving the objective of harmless treatment of household waste incinerator fly ash. This invention process is simple and the obtained finished concrete products have the grade strength of CL40, have the apparent density of 1,800 and have good macroscopic performance.

7. Title: A method of preparing ecological concrete by using incinerator fly ash as additive
Patent Publication No: CN1541968
Applicants: Tongji University Inventors: Huisheng Shi, Ling Yuan
Filing Date: 2013 Nov. 6 Date of Publication: 2004-11-3
Abstract: This invention refers to a method of preparing ecological concrete by using incinerator fly ash as additive. The method takes cement, active slag fines and incinerator fly ash as cementing materials, together with auxiliary materials (zeolite and additives like sodium silicate and water reducing agent), to prepare ecological concrete according to their proper matching ratios. With good mechanical property and excellent permeability resistance performance, the concrete can effectively absorb, take and stabilize heavy metals and other hazardous substances to enable them to be difficult for leaching-out and conform to safety use standards. This invention will recycle incinerator fly ash for use again, and produce apparent social benefits and economic benefits.

8. Title: A method of stabilizing and recycling municipal solid waste incinerator fly ash
Patent Publication No: CN 01050076
Applicant: She Zhang
Inventors: She Zhang, Huiwen Ma, Libing Sun
Filing Date:: 2007-5-17 Date of Publication: 2007-10-10
Abstract: This invention refers to a method of stabilizing and recycling municipal solid waste incinerator fly ash. The method replaces fine aggregates (5% to 25% of concrete or mortar) with municipal solid waste incinerator fly ash to prepare concrete block or masonry mortar. By using the method of stabilizing heavy metal elements of fly ash with hydration-ammonium bicarbonate acidification-ammonium sulfide vulcanization, stabilize heavy metal elements of fly ash under the water-insoluble state without additionally introducing any metal ions. After stabilizing treatment, the fly ash can be used to replace fine aggregates of concrete or mortar. This will not produce any adverse effect upon physical property of concrete and mortar. In addition, fly ash has the hydraulicity function, so it can enhance physical strength of concrete. Once concrete or mortar breaks into pieces, their leachate's heavy metal dissolution concentration is far less than the threshold values specified in the Identification Standards for Hazardous Wastes for Identification for Extraction Toxicity (GB5085.3-1996).

The summarized patents and published patent applications which are all published patent applications in Mainland China are entirely in Mandarin. The above English translations were received through a representative of the present inventors and/or a company in mainland China to which the respective corresponding patent applications resulting in the above identified published patent applications were assigned.

There are some reports about using fly ash for producing and making concrete block and solidifying heavy metal, but there is no report or previous patent or previous patent application that discloses the method described herein.

SUMMARY O' THE INVENTION

The present invention is a method for removing toxins from fly ash. This invention utilities a step by step process for combining synthesis blocking agents and catalysts to fly ash coupled with heating and cooling to remove toxins.

It is an object of the present invention to provide a method and apparatus for comprehensive resource recycling of fly ash after the harmful toxins have been removed. A major innovation of the present invention process is to dispose of fly ash pollution produced by a household waste incineration power plant with three kinds of technologies, respectively the low-temperature, high-efficient and cost-effective cracking technology for dioxins in the fly ash, the curing technology of heavy metals in fly ash, and the recycling of processed fly ash into a useable product. The low temperature cracking technology to remove dioxins from fly ash discarded for waste removal from waste incinerators (household, factory, etc.) is completely different from existing melting technology used widely throughout the world.

It is a further object of the present invention to use a melting technology of heating for two to three hours through which the dioxins will be decomposed. This process is different from the solidification landfill that only solidifies dioxin pollution at the source, but does not decompose the dioxins. The new and innovative method of the present invention heats the fly ash containing dioxins while excluding the inertia of an oxygen atmosphere or under reduction atmosphere. The process takes 30 to 60 minutes depending upon the time it takes for the dioxins to be decomposed. dioxins in fly ash are decomposed by up to and over 98% by using these technologies and devices. The solidification technology of heavy metals in fly ash obtains excellent solidification results by adding at least one high-efficient hardener. Heavy metals leached out of fly ash after disposal can reach the control standards of Category I General Industrial Solid Waste standards specified in the Standards for Pollution Control on the Storage and Disposal Site for General Industrial Solid Wastes (GB18599), and they can be used, stored and disposed of at will.

It is still a further object of the present invention to provide a method that systematically combines the management of heavy metals in fly ash with recycle technology. This innovative approach allows the relevant disposal agents and technologies for heavy metal management to work in conjunction with the functional agents and technologies for subsequent recycling. The fly ash is treated by a new and harmless organic chemical foaming agent (with chemical foaming function and heavy metal solidifier function) to manufacture lightweight foaming brick blocks by way of foaming method. This technology will dramatically reduce costs since it does not require a steaming process that I necessary in the prior art processes, or boiler or steaming caldrons. This will dramatically reduce energy consumption and environmental pollution. The final product of "foamed concrete" is also a new type of energy-saving building material that is greatly promoted and clarified by relevant national departments and regulations.

It is an additional object of the present invention to decompose dioxins thereby fundamentally solving the dioxins pollution problem from the source. This in turn will not produce subsequent continual pollution risks because dioxins can be disposed of in a batch with industrially low energy input equipment and disposal costs. As to the pollution of heavy metals of fly ash and slag left after the disposal of dioxins, recycle technology combines solidification with recycling to solve the problem of leaching from the pollution of heavy metals and enable the fly ash to be recycled. This will neither cause pollution nor use land, but instead will turn the waste into a resource, save energy and greatly enhance the utilization rate of social resources. Creating a useable product from a previously toxic substance creates enormous ecological benefits. Advancements such as the present invention are extremely important when considering the sustainability of our worlds natural resources and the continuously growing world population.

Described in detail, the present invention is a A method of treating dioxins found in fly ash fount in waste incinerator flue from a waste incineration power plant, comprising: (a) collect said fly ash from said waste incinerator flue of said waste incineration power plant; (b) add at least one secondary synthesis blocking agent and add at least one catalyst, the at least one secondary synthesis blocking agent consists of sodium thiosulfate, sodium sulfide, sodium hypophosphite and diammonium phosphate; (c) put fly ash into a hermetic rotary furnace for heating treatment selected from the group consisting of:
(i) keeping the temperature in said hermetic rotary furnace at 300° C. for 120 minutes; in the gas environment of the hermetic rotary furnace, keeping a hydrogen volume content 0.1%, keeping a oxygen volume content is 0.1% and keeping a nitrogen volume content at 99.8%,
(ii) put fly ash into the hermetic rotary furnace for heating treatment at 500° C. for 80 minutes; in the gas environment of the hermetic rotary furnace, the hydrogen volume content is 0.2%, the oxygen volume content is 0.2% and the remaining content is 99.6% nitrogen, (iii) put fly ash into the hermetic rotary furnace for heating treatment at 500° C. for 120 minutes in the gas environment of the hermetic rotary furnace with the hydrogen volume content equal to 0.5%, the oxygen volume content equal to 0.3% and the remaining content is 99.2% nitrogen, (iv) put fly ash into the hermetic rotary furnace for heating treatment at 800° C. for 100 minutes; in the gas environment of the hermetic rotary furnace, the hydrogen volume content is 0.2%, the oxygen volume content is 0.5% and the remaining content is 99.3% nitrogen, (v) put fly ash into the hermetic rotary furnace for heating treatment at 600° C. for 120 minutes; in the gas environment of the hermetic rotary furnace, the hydrogen volume content is 0.2%, the oxygen volume content is 0.5% and the remaining content is 99.3% nitrogen, (vi) put the fly ash into the hermetic rotary furnace filled with nitrogen for heating treatment, the oxygen content in the furnace is lower than 0.4 vol %, the temperature for heating the furnace is controlled at 500° C., the heating treatment time is set as 30 minutes, and through a transport or (vii) put the fly ash into the hermetic rotary furnace heating treatments at 450 C for 50 minutes, in the gas environment of the hermetic rotary furnace full of nitrogen for heating treatment, the oxygen volume is lower than 0.4 volume percent and the hydrogen volume exceeds 99.6%, (viii) put rotary furnace filled with nitrogen for heating treatment with the oxygen content in the furnace lower than 0.4 vol %, the temperature for heating the furnace is controlled at 300° C., the heating treatment time is set at 90 minutes, (ix) put the fly ash into the hermetic rotary furnace filled with nitrogen for heating treatment, with the oxygen content in the furnace is lower than 0.4 vol %, the nitrogen in the furnace is over 99.6%, the temperature for heating the furnace controlled at 550° C., the heating treatment time is set as 25 minutes, (x) put the fly ash into the hermetic rotary furnace filled with nitrogen for heating treatment, with the oxygen content in the furnace is lower than 0.4 vol %, the hydrogen in the furnace is over 99.6%, the temperature for heating the furnace controlled at 380° C., the heating treatment time is set as 60 minutes, (xi) put the fly ash into the hermetic rotary furnace filled with nitrogen for heating treatment, with the oxygen content in the furnace is lower than 0.4 vol %, the hydrogen in the furnace is over 99.6%, the temperature for heating the furnace controlled at 450° C., the heating treatment time is set as 45 minutes, (xi) put the fly ash into the hermetic rotary furnace filled with nitrogen for heating treatment, with the oxygen content in the furnace is lower than 0.4 vol %, the hydrogen in the furnace is over 99.6%, the temperature for heating the furnace controlled at 450° C., the heating treatment time is set as 45 minutes, (xii) put the fly ash into the hermetic rotary furnace filled with nitrogen for heating treatment, with the oxygen content in the furnace is lower than 0.4 vol %, the hydrogen in the furnace is over 99.6%, the temperature for heating the furnace controlled at 500° C., the heating treatment time is set as 35 minutes, (xiii) put the fly ash into the hermetic rotary furnace filled with nitrogen for heating treatment, with the oxygen content in the furnace is lower than 0.4 vol %, the hydrogen in the furnace is over 99.6%, the temperature for heating the furnace controlled at 300° C., the heating treatment time is set as 80 minutes, (xiv) put the fly ash into the hermetic rotary furnace filled with nitrogen for heating treatment, with the oxygen content in the furnace is lower than 0.4 vol %, the hydrogen in the furnace is over 99.6%, the temperature for heating the furnace controlled at 480° C., the heating treatment time is set as 40 minutes; and
(d) lower an environmental temperature in the hermetic rotary furnace to between 180° C.–200° C. and transporting an exhaust gas produced in said hermetic rotary furnace to a boiler of said waste incineration power plant resulting in the reduction of dioxin in the fly ash.

Defined more broadly, the present invention is a method of treating dioxins found in fly ash fount in waste incinerator flue from a waste incineration power plant, comprising: (a) collect said fly ash from said waste incinerator flue of said waste incineration power plant; (b) add at least one secondary synthesis blocking agent and add at least one catalyst, the at least one secondary synthesis blocking agent selected from the group consisting of sodium thiosulfate, sodium sulfide, sodium hypophosphite and diammonium phosphate; (c) put fly ash into a hermetic heating device selected from the group consisting of a hermetic rotary furnace, a muffle furnace, a box-type furnace, a tube furnace, a bell-jar furnace, a mesh belt furnace, a well-type resistance furnace, an induction cooker and a microwave oven, for heating treatment selected from the group consisting of: (i) keeping the temperature in said hermetic heating device at 300° C. for 120 minutes; in the gas environment of the hermetic heating device, keeping a hydrogen volume content 0.1%, keeping a oxygen volume content is 0.1% and keeping a nitrogen volume content at 99.8%, (ii) put fly ash into the hermetic heating device for heating treatment at 500° C. for 80 minutes; in the gas environment of the hermetic heating device, the hydrogen volume content is 0.2%, the oxygen volume content is 0.2% and the remaining content is 99.6% nitrogen, (iii) put fly ash into the hermetic heating device for heating treatment at 500° C. for 120 minutes in the gas environment of the hermetic heating device with the hydrogen volume content equal to 0.5%, the oxygen volume content equal to 0.3% and the remaining content is 99.2% nitrogen, (iv) put fly ash into the hermetic heating device for heating treatment at 800° C. for 100 minutes; in the gas environment of the hermetic heating device, the hydrogen volume content is 0.2%, the oxygen volume content is 0.5% and the remaining content is 99.3% nitrogen, (v) put fly ash into the hermetic heating device for heating treatment at 600° C. for 120 minutes; in the gas environment of the hermetic heating device, the hydrogen volume content is 0.2%, the oxygen volume content is 0.5% and the remaining content is 99.3% nitrogen, (vi) put the fly ash into the hermetic heating device filled with nitrogen for heating treatment, the oxygen content in the furnace is lower than 0.4 vol %, the temperature for heating the furnace is controlled at 500° C., the heating treatment time is set as 30 minutes, and through a transport or (vii) put the fly ash into the hermetic heating device heating treatments at 450 C for 50 minutes, in the gas environment of the hermetic heating device full of nitrogen for heating treatment, the oxygen volume is lower than 0.4 volume percent and the hydrogen volume exceeds 99.6%, (viii) put rotary furnace filled with nitrogen for heating treatment with the oxygen content in the furnace lower than 0.4 vol %, the temperature for heating the furnace is controlled at 300° C., the heating treatment time is set at 90 minutes, (ix) put the fly ash into the hermetic heating device filled with nitrogen for heating treatment, with the oxygen content in the furnace is lower than 0.4 vol %, the nitrogen in the furnace is over 99.6%, the temperature for heating the furnace controlled at 550° C., the heating treatment time is set as 25 minutes, (x) put the fly ash into the hermetic heating device filled with nitrogen for heating treatment, with the oxygen content in the furnace is lower than 0.4 vol %, the hydrogen in the furnace is over 99.6%, the temperature for heating the furnace controlled at 380° C., the heating treatment time is set as 60 minutes, (xi) put the fly ash into the hermetic heating device filled with nitrogen for heating treatment, with the oxygen content in the furnace is lower than 0.4 vol %, the hydrogen in the furnace is over 99.6%, the temperature for heating the furnace controlled at 450° C., the heating treatment time is set as 45 minutes, (xi) put the fly ash into the hermetic heating device filled with nitrogen for heating treatment, with the oxygen content in the furnace is lower than 0.4 vol %, the hydrogen in the furnace is over 99.6%, the temperature for heating the furnace controlled at 450° C., the heating treatment time is set as 45 minutes, (xii) put the fly ash into the hermetic heating device filled with nitrogen for heating treatment, with the oxygen content in the furnace is lower than 0.4 vol %, the hydrogen in the furnace is over 99.6%, the temperature for heating the furnace controlled at 500° C., the heating treatment time is set as 35 minutes, (xiii) put the fly ash into the hermetic heating device filled with nitrogen for heating treatment, with the oxygen content in the furnace is lower than 0.4 vol %, the hydrogen in the furnace is over 99.6%, the temperature for heating the furnace controlled at 300° C., the heating treatment time is set as 80 minutes, (xiv) put the fly ash into the hermetic heating device filled with nitrogen for heating treatment, with the oxygen content in the furnace is lower than 0.4 vol %, the hydrogen in the furnace is over 99.6%, the temperature for heating the furnace controlled at 480° C., the heating treatment time is set as 40 minutes; and (d) lower an environmental temperature in the hermetic heating device to between 180° C.–200° C. and transporting an exhaust gas produced in said hermetic heating device to a boiler of said waste incineration power plant resulting in the reduction of dioxin in the fly ash.

Further novel features and other objects of the present invention will become apparent from the following detailed description and the claims of invention.

DETAILED DESCRIPTION OF EMBODIMENTS OF THE PRESENT INVENTION

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

A dangerous waste called fly ash rises from the garbage incinerator flue in waste incineration power plants. This fly ash contains a lot of toxic substances such as dioxin, and if inappropriately disposed of, will cause severe harm to the environment and human bodies, e.g. fetal malformation and carcinomatous changes in human beings. Prior to the present invention, there has not been even one effective method for disposing of such dangerous waste. Therefore, reasonable treatment of incinerator waste flue and improvements in the treatment of fly ash is extremely important to the environment, human and animal life forms, and surrounding ecosystems.

The purpose of this invention is to provide at least one disposal method for fly ash.

The present invention is a method of treating dioxins found in fly ash found in waste incinerator flues from a waste incinerator power plant. Once the processes are moved to substantially reduce the dioxins, the process enables the creation of useful products such as concrete blocks which can be used in construction.

With respect to the methods discussed below, Embodiments 1-6 disclose details for what are essentially steps "a" and "e" in the process as identified in claim 1 and step "b" which include the different methods of heating which include oxygen, nitrogen, temperatures and times, are the critical steps in the present invention and these are discussed in Embodiments 1-6 and also separately discussed in Embodiments 7-14. It will be appreciated that the claims can be defined as including the step for "a" as set forth in claim 1 and then for claim element "b" can have variations of the various heating components and then step "c" for the cooling process.

The present invention fly ash disposal method includes the following steps:

Collect dust from the waste incinerator flue of the waste incineration power plant, and place the collected dust at a very low oxygen environment for fully heating, with the waste gas produced in this way discharged into the boiler of the power plant. This heating treatment lasts 30 minutes to 90 minutes and the heating treatment temperature ranges from from 300° C. to 500° C. This very low oxygen environment functions as a hermetic heating device in which the content of oxygen is lower than 0.4 percent by volume.

The above-mentioned hermetic heating device is selected from the group consisting of a hermetic rotary furnace, a muffle furnace, a box-type furnace, a tube furnace, a bell-jar furnace, a mesh belt furnace, a well-type resistance furnace, an induction cooker and a microwave oven.

The beneficial effects of this invention are as follows: The treatment method described in this invention greatly reduces the content of dioxin-type substances, and therefore reduces the harm brought about by the dioxin-type substances to environments and human beings.

In this part, details of the present invention including chemicals and apparatus will be described, including the methodology and steps to implement the present invention.

Embodiment 1

For this method of treating dioxins found in fly ash found in waste incinerator flues from a waste incinerator power plant, the following steps are included:
1) Collect fly ash from the waste incinerator flue of the waste incineration power plant, add at least one secondary synthesis blocking agent that is 2% of fly ash in mass to fly ash, and add at least one catalyst that is 5% of fly ash in mass to fly ash, the catalyst is selected from the group consisting of: $V_2O_5$—$WO_3$/$TiO_2$ and $V_2O_5$—$MoO_3$/$TiO_2$ (vanadium pentoxide, tungsten trioxide or pentoxide vanadium-titanium dioxide); the at least one secondary synthesis blocking agent consists of sodium thiosulfate, sodium sulfide, sodium hypophosphite and diammonium phosphate by the mass ratio of 1:1:1:1.
2) Put fly ash into the hermetic rotary furnace for heating treatment at 300° C. for 120 minutes; in the gas environment of the hermetic rotary furnace, the hydrogen volume content is 0.1%, the oxygen volume content is 0.1% and the remaining content is protective gas—nitrogen.
3) Lower the environmental temperature in the previous step to 180° C.-200° C. and transport the exhaust gas produced in the previous heating step to the boiler of the power plant. Through testing, before the treatment, the equivalent concentration of dioxin-like toxicity in the fly ash was 311 ng TEQ/kg[1] nano grams of Toxic Equivalent Quantity (TEQ) per kilogram; after the heating treatment, the equivalent concentration of dioxin-like toxicity in the fly ash was reduced to 0.11 ng TEQ/kg.

ng TEQ/kg—This unit of measurement is nano grams of toxic equivalence (TEQ) per kilogram. In reference to their importance as environmental toxicants the term dioxins is used almost exclusively refereed to as the sum of compounds (as TEQ)

Embodiment 2

For this method of treating dioxins found in fly ash found in waste incinerator flues from a waste incinerator power plant, the following steps are included:
1) Collect fly ash from the waste incinerator flue of the waste incineration power plant, add at least one secondary synthesis blocking agent that is 5% of fly ash in mass to fly ash and add at least one catalyst that is 1% of fly ash in mass to fly ash; the catalyst is selected from the group consisting of: $V_2O_5$—$WO_3$/$TiO_2$ and $V_2O_5$—$MoO_3$/$TiO_2$; the at least one secondary synthesis blocking agent consists of sodium thiosulfate, sodium sulfide, sodium hypophosphite and diammonium phosphate by the mass ratio of 1:1.2:1.2:0.8.
2) Put fly ash into the hermetic rotary furnace for heating treatment at 500° C. for 80 minutes; in the gas environment of the hermetic rotary furnace, the hydrogen volume content is 0.2%, the oxygen volume content is 0.2% and the remaining content is protective gas—nitrogen.
3) Lower the environmental temperature in the previous step to 80° C.-100° C. and transport the exhaust gas produced in the previous heating step to the boiler of the power plant.

Through testing, before the present invention treatment, the equivalent concentration of dioxin-like toxicity in the fly ash was 522 ng TEQ/kg; after the heating treatment, such concentration was reduced to 0.10 ng TEQ/kg.

Embodiment 3

For this method of treating dioxins found in fly ash found in waste incinerator flues from a waste incinerator power plant, the following steps are included:
1) Collect fly ash from the waste incinerator flue of the waste incineration power plant, add at least one secondary synthesis blocking agent that is 10% of fly ash in mass to fly ash and add at least one catalyst that is 1% of fly ash in mass to fly ash; this catalyst is selected from the group consisting of $V_2O_5$—$WO_3$/$TiO_2$ and $V_2O_5$—$MoO_3$/$TiO_2$ by the mass ratio of 1:1; the at least one secondary synthesis blocking agent consists of sodium thiosulfate, sodium sulfide, sodium hypophosphite and diammonium phosphate by the mass ratio of 1:0.8:0.8:1.2.
2) Put fly ash into the hermetic rotary furnace for heating treatment at 500° C. for 120 minutes in the gas environment of the hermetic rotary furnace with the hydrogen volume content equal to 0.5%, the oxygen volume content equal to 0.3% and the remaining content is nitrogen.
3) Lower the environmental temperature in the previous step to 60° C.-80° C. and transport the exhaust gas produced in the previous heating step to the boiler of the power plant. Through testing, before the treatment, the equivalent concentration of dioxin-like toxicity in the fly ash was 633 ng TEQ/kg; after the present invention treatment, such concentration was reduced to 0.23 ng TEQ/kg.

Embodiment 4

For this method of treating dioxins found in fly ash found in waste incinerator flues from a waste incinerator power plant, the following steps are included:
1) Collect fly ash from the waste incinerator flue of the waste incineration power plant, add at least one secondary synthesis blocking agent that is 6% of fly ash in mass to fly ash and add at least one catalyst that is 2% of fly ash in mass to fly ash; the at least one catalyst is selected from the group consisting of: $V_2O_5$—$WO_3$/$TiO_2$ and $V_2O_5$—$MoO_3$/$TiO_2$ by the mass ratio of 1:2; the at least one secondary synthesis blocking agent consists of sodium thiosulfate, sodium sulfide, sodium hypophosphite and diammonium phosphate by the mass ratio of 1:0.8:0.8:1.2.
2) Put fly ash into the hermetic rotary furnace for heating treatment at 800° C. for 100 minutes; in the gas environment of the hermetic rotary furnace, the hydrogen volume content is 0.2%, the oxygen volume content is 0.5% and the remaining content is protective gas—nitrogen.

3) Lower the environmental temperature in the previous step to 60° C.-80° C. and transport the exhaust gas produced in the previous heating step to the boiler of the power plant.

Through test, before the treatment, the equivalent concentration of dioxin-like toxicity in the fly ash was 458 ng TEQ/kg; after the present invention treatment, such concentration was reduced to 0.16 ng TEQ/kg.

Embodiment 5

For this method of treating dioxins found in fly ash found in waste incinerator flues from a waste incinerator power plant, the following steps are included:
1) Collect fly ash from the waste incinerator flue of the waste incineration power plant, add at least one secondary synthesis blocking agent that is 6% of fly ash in mass to fly ash and add at least one catalyst that is 2% of fly ash in mass to fly ash; the at least one catalyst is selected from the group consisting of: $V_2O_5$—$WO_3$/$TiO_2$ and $V_2O_5$—$MoO_3$/$TiO_2$ by the mass ratio of 1:2; the at least one secondary synthesis blocking agent is selected from the group consisting of sodium thiosulfate, sodium sulfide, sodium hypophosphite, and diammonium phosphate by the mass ratio of 1:0.8:0.8:1.2.

Put fly ash into the hermetic rotary furnace for heating treatment at 600° C. for 120 minutes; in the gas environment of the hermetic rotary furnace, the hydrogen volume content is 0.2%, the oxygen volume content is 0.5% and the remaining content is protective gas—nitrogen.

Embodiment 6

For this method of treating dioxins found in fly ash found in waste incinerator flues from a waste incinerator power plant, the following steps are included:

The dust in the garbage incinerator flue in the waste incineration power plant is collected and put into the hermetic rotary furnace filled with nitrogen for heating treatment (the oxygen content in the furnace is lower than 0.4 vol %), the temperature for heating the furnace is controlled at 500° C., the heating treatment time is set as 30 minutes, and through a transport or connecting pipe, the waste gas generated in the rotary furnace is sent back to the furnace of the power plant.

Through testing, before the present invention treatment, the equivalent concentration of dioxin-like toxicity in the dust was 326 ng TEQ/kg; after the present invention treatment, the equivalent concentration of dioxin-like toxicity in the dust was reduced to 1.2 ng TEQ/kg.

Embodiment 7

For this method of treating dioxins found in fly ash found in waste incinerator flues from a waste incinerator power plant, the following steps are included:

The dust in the garbage incinerator flue in the waste incineration power plant is collected and put into the hermetic rotary furnace full of nitrogen for heating treatment (the oxygen content in the furnace is lower than 0.4 vol %), the temperature for heating the furnace is controlled at 450° C., the heating treatment time is set as 50 minutes, and through a transport or connection pipe, the waste gas generated in the rotary furnace is sent back to the furnace of the power plant.

Through testing, before the present invention treatment, the equivalent concentration of dioxin-like toxicity in the dust was 280 ng TEQ/kg; after the present invention treatment, such concentration was reduced to 2.0 ng TEQ/kg.

Embodiment 8

For this method of treating dioxins found in fly ash found in waste incinerator flues from a waste incinerator power plant, the following steps are included:

The dust in the garbage incinerator flue of the waste incineration power plant is collected and put into the hermetic rotary furnace filled with nitrogen for heating treatment (the oxygen content in the furnace is lower than 0.4 vol %), the temperature for heating the furnace is controlled at 300° C., the heating treatment time is set at 90 minutes, and through a transport or connection pipe, the waste gas generated in the rotary furnace is sent back to the furnace of the power plant.

Through testing, before the present invention treatment, the equivalent concentration of dioxin-like toxicity in the dust was 260 ng TEQ/kg; after the present invention treatment, such concentration was reduced to 1.1 ng TEQ/kg.

Embodiment 9

For this method of treating dioxins found in fly ash found in waste incinerator flues from a waste incinerator power plant, the following steps are included:

The dust in the garbage incinerator flue in the waste incineration power plant is collected and placed into the hermetic rotary furnace filled with nitrogen for heating treatment (the oxygen content in the furnace is lower than 0.4 vol %), the temperature for heating the furnace is controlled at 550° C., the heating treatment time is set as 25 minutes, and through a transport or connection pipe, the waste gas generated in the rotary furnace is sent back to the furnace of the power plant.

Through testing, before the present invention treatment, the equivalent concentration of dioxin-like toxicity in the dust was 311 ng TEQ/kg; after the present invention treatment, such concentration was reduced to 1.5 ng TEQ/kg.

Embodiment 10

For this method of treating dioxins found in fly ash found in waste incinerator flues from a waste incinerator power plant, the following steps are included:

The dust in the garbage incinerator flue in the waste incineration power plant is collected and placed into the hermetic rotary furnace full of nitrogen for heating treatment (the oxygen content in the furnace is lower than 0.4 vol %), the temperature for heating the furnace is controlled at 380° C., the heating treatment time is set as 60 minutes, and by means of a transport or connection pipe, the waste gas generated in the rotary furnace is sent back to the furnace of the power plant.

Through testing, before the present invention treatment, the equivalent concentration of dioxin-like toxicity in the dust was 321 ng TEQ/kg; after the present invention treatment, the equivalent concentration of dioxin-like toxicity was reduced to 1.9 ng TEQ/kg.

Embodiment 11

For this method of treating dioxins found in fly ash found in waste incinerator flues from a waste incinerator power plant, the following steps are included:

The dust in the garbage incinerator flue in the waste incineration power plant is collected and put into the hermetic rotary furnace filled with nitrogen for heating treatment (the oxygen content in the furnace is lower than 0.4 vol %), the temperature for heating the furnace is controlled at 450° C., the heating treatment time is set as 45 minutes, and through a transition or connection pipe, the waste gas generated in the rotary furnace is sent back to the furnace of the power plant.

Through testing, before the present invention treatment, the equivalent concentration of dioxin-like toxicity in the dust was 332 ng TEQ/kg; after the present invention heating treatment, the above-mentioned concentration was reduced to 2.2 ng TEQ/kg.

Embodiment 12

For this method of treating dioxins found in fly ash found in waste incinerator flues from a waste incinerator power plant, the following steps are included:

The dust in the garbage incinerator flue in the waste incineration power plant is collected and placed into the hermetic rotary furnace full of nitrogen for heating treatment (the content of oxygen in the furnace is lower than 0.4 vol %), the temperature for heating the furnace is controlled at 500° C., the heating treatment time is set as 35 minutes, and through a transition or connection pipe, the waste gas generated in the rotary furnace is sent back to the furnace of the power plant.

Through testing, before the present invention treatment, the equivalent concentration of dioxin-like toxicity in the dust was 522 ng TEQ/kg; after the present invention treatment, such concentration was reduced to 6.75 ng TEQ/kg.

Embodiment 13

For this method of treating dioxins found in fly ash found in waste incinerator flues from a waste incinerator power plant, the following steps are included:

The dust in the garbage incinerator flue in the waste incineration power plant is collected and put into the hermetic rotary furnace filled with nitrogen for heating treatment (the oxygen content in the furnace is lower than 0.4 vol %), the temperature for heating the furnace is controlled at 300° C., the heating treatment time is set as 80 minutes, and through a transition or connection pipe, the waste gas generated in the rotary furnace is sent back to the furnace of the power plant.

Through testing, before the present invention treatment, the equivalent concentration of dioxin-like toxicity in the dust was 458 ng TEQ/kg; after the present invention treatment, the foregoing concentration was reduced to 3.26 ng TEQ/kg.

Embodiment 14

For this method of treating dioxins found in fly ash found in waste incinerator flues from a waste incinerator power plant, the following steps are included:

The dust in the garbage incinerator flue in the waste incineration power plant is collected and placed into the hermetic rotary furnace full of nitrogen for heating treatment (the oxygen content in the furnace is lower than 0.4 vol %), the temperature for heating the furnace is controlled at 480° C., the heating treatment time is set as 40 minutes, and through the pipe, the waste gas generated in the rotary furnace is sent back to the furnace of the power plant.

Through testing, before the present invention treatment, the equivalent concentration of dioxin-like toxicity in the dust was 522 ng TEQ/kg; after the present invention treatment, such concentration was reduced to 6.75 ng TEQ.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

What is claimed is:

1. A method of treating dioxins found in fly ash found in waste incinerator flue from a waste incineration power plant, comprising:
    a. collect said fly ash from said waste incinerator flue of said waste incineration power plant, add at least one secondary synthesis blocking agent that is 2% of fly ash in mass to fly ash, and add at least one catalyst that is 5% of fly ash in mass to fly ash, the catalyst selected from the group consisting of: $V_2O_5$—$WO_3$/$TiO_2$ and $V_2O_5$—$MoO_3$/$TiO_2$, the at least one secondary synthesis blocking agent consists of sodium thiosulfate, sodium sulfide, sodium hypophosphite and diammonium phosphate by the mass ratio of 1:1:1:1;
    b. put fly ash into a hermetic rotary furnace for heating treatment at 300° C. for 120 minutes; in the gas environment of the hermetic rotary furnace, keeping a hydrogen volume content 0.1%, keeping a oxygen volume content is 0.1% and keeping a nitrogen volume content at 98:% resulting in a dioxin reduction from 311 ng TEQ/kg to 0.11 ng TEQ/kg; and
    c. lower an environmental temperature in the hermetic rotary furnace to between 180° C.-200° C. and transporting an exhaust gas produced in the hermetic rotary furnace to a boiler of said waste incineration power plant, resulting in a dioxin reduction from 311 ng TEQ/kg to 0.11 ng TEQ/kg.

2. A method of treating dioxins found in fly ash fount in waste incinerator flue from a waste incineration power plant, comprising:
    a. collect said fly ash from said waste incinerator flue of said waste incineration power plant;
    b. add at least one secondary synthesis blocking agent and add at least one catalyst, the at least one secondary synthesis blocking agent consists of sodium thiosulfate, sodium sulfide, sodium hypophosphite and diammonium phosphate;
    c. put fly ash into a hermetic rotary furnace for heating treatment selected from the group consisting of:
        (i) keeping the temperature in said hermetic rotary furnace at 300° C. for 120 minutes; in the gas environment of the hermetic rotary furnace, keeping a hydrogen volume content 0.1%, keeping a oxygen volume content is 0.1% and keeping a nitrogen volume content at 99.8%,
        (ii) put fly ash into the hermetic rotary furnace for heating treatment at 500° C. for 80 minutes; in the gas environment of the hermetic rotary furnace, the hydrogen volume content is 0.2%, the oxygen volume content is 0.2% and the remaining content is 99.6% nitrogen,
        (iii) put fly ash into the hermetic rotary furnace for heating treatment at 500° C. for 120 minutes in the gas environment of the hermetic rotary furnace with the hydrogen volume content equal to 0.5%, the oxygen volume content equal to 0.3% and the remaining content is 99.2% nitrogen, (iv) put fly ash into the hermetic rotary furnace for heating treatment at 800° C. for 100 minutes; in the gas environment of the hermetic rotary furnace, the hydrogen volume content is 0.2%, the oxygen volume content is 0.5% and the remaining content is 99.3% nitrogen, (v) put fly ash into the hermetic rotary furnace for heating treatment at 600° C. for 120 minutes; in the gas environment of the hermetic rotary furnace, the hydrogen volume content is 0.2%, the oxygen volume content is 0.5% and the remaining content is 99.3% nitrogen, (vi) put the fly ash into the hermetic rotary furnace filled with nitrogen for heating treatment, the oxygen content in the furnace is lower than 0.4 vol %, the temperature for heating the furnace is controlled at 500° C., the heating treatment time is set as 30 minutes, and through a transport or (vii) put the fly ash into the hermetic rotary furnace heating treatments at 450 C for 50 minutes, in the gas environment of the hermetic rotary furnace full of nitrogen for heating treatment, the oxygen volume is lower than 0.4 volume percent and the hydrogen volume exceeds 99.6%, (viii) put rotary furnace filled with nitrogen for heating treatment with the oxygen content in the furnace lower than 0.4 vol %, the temperature for heating the furnace is controlled at 300° C., the heating treatment time is set at 90 minutes, (ix) put the fly ash into the hermetic rotary furnace filled with nitrogen for heating treatment, with the oxygen content in the furnace is lower than 0.4 vol %, the nitrogen in the furnace is over 99.6%, the temperature for heating the furnace controlled at 550° C., the heating treatment time is set as 25 minutes, (x) put the fly ash into the hermetic rotary furnace filled with nitrogen for heating treatment, with the oxygen content in the furnace is lower than 0.4 vol %, the hydrogen in the furnace is over 99.6%, the temperature for heating the furnace controlled at 380° C., the heating treatment time is set as 60 minutes, (xi) put the fly ash into the hermetic rotary furnace filled with nitrogen for heating treatment, with the oxygen content in the furnace is lower than 0.4 vol %, the hydrogen in the furnace is over 99.6%, the temperature for heating the furnace controlled at 450° C., the heating treatment time is set as 45 minutes, (xi) put the fly ash into the hermetic rotary furnace filled with nitrogen for heating treatment, with the oxygen content in the furnace is lower than 0.4 vol %, the hydrogen in the furnace is over 99.6%, the temperature for heating the furnace controlled at 450° C., the heating treatment time is set as 45 minutes, (xii) put the fly ash into the hermetic rotary furnace filled with nitrogen for heating treatment, with the oxygen content in the furnace is lower than 0.4 vol %, the hydrogen in the furnace is over 99.6%, the temperature for heating the furnace controlled at 500° C., the heating treatment time is set as 35 minutes, (xiii) put the fly ash into the hermetic rotary furnace filled with nitrogen for heating treatment, with the oxygen content in the furnace is lower than 0.4 vol %, the hydrogen in the furnace is over 99.6%, the temperature for heating the furnace controlled at 300° C., the heating treatment time is set as 80 minutes, (xiv) put the fly ash into the hermetic rotary furnace filled with nitrogen for heating treatment, with the oxygen content in the furnace is lower than 0.4 vol %, the hydrogen in the furnace is over 99.6%, the temperature for heating the furnace controlled at 480° C., the heating treatment time is set as 40 minutes; and d. lower an environmental temperature in the hermetic rotary furnace to between 180° C.-200° C. and transporting an exhaust gas produced in said hermetic rotary furnace to a boiler of said waste incineration power plant resulting in the reduction of dioxin in the fly ash.

3. A method of treating dioxins found in fly ash fount in waste incinerator flue from a waste incineration power plant, comprising:
   a. collect said fly ash from said waste incinerator flue of said waste incineration power plant;
   b. add at least one secondary synthesis blocking agent and add at least one catalyst, the at least one secondary synthesis blocking agent selected from the group consisting of sodium thiosulfate, sodium sulfide, sodium hypophosphite and diammonium phosphate;
   c. put fly ash into a hermetic heating device selected from the group consisting of a hermetic rotary furnace, a muffle furnace, a box-type furnace, a tube furnace, a bell jar furnace, a mesh belt furnace, a well-type resistance furnace, an induction cooker and a microwave oven, for heating treatment selected from the group consisting of:
      (i) keeping the temperature in said hermetic heating device at 300° C. for 120 minutes; in the gas environment of the hermetic heating device, keeping a hydrogen volume content 0.1%, keeping a oxygen volume content is 0.1% and keeping a nitrogen volume content at 99.8%,
      (ii) put fly ash into the hermetic heating device for heating treatment at 500° C. for 80 minutes; in the gas environment of the hermetic heating device, the hydrogen volume content is 0.2%, the oxygen volume content is 0.2% and the remaining content is 99.6% nitrogen,
      (iii) put fly ash into the hermetic heating device for heating treatment at 500° C. for 120 minutes in the gas environment of the hermetic heating device with the hydrogen volume content equal to 0.5%, the oxygen volume content equal to 0.3% and the remaining content is 99.2% nitrogen,
      (iv) put fly ash into the hermetic heating device for heating treatment at 800° C. for 100 minutes; in the gas environment of the hermetic heating device, the hydrogen volume content is 0.2%, the oxygen volume content is 0.5% and the remaining content is 99.3% nitrogen,
      (v) put fly ash into the hermetic heating device for heating treatment at 600° C. for 120 minutes; in the gas environment of the hermetic heating device, the hydrogen volume content is 0.2%, the oxygen volume content is 0.5% and the remaining content is 99.3% nitrogen, (vi) put the fly ash into the hermetic heating device filled with nitrogen for heating treatment, the oxygen content in the furnace is lower than 0.4 vol %, the temperature for heating the furnace is controlled at 500° C., the heating treatment time is set as 30 minutes, and through a transport or
(vii) put the fly ash into the hermetic heating device heating treatments at 450 C for 50 minutes, in the gas environment of the hermetic heating device full of nitrogen for heating treatment, the oxygen volume is lower than 0.4 volume percent and the hydrogen volume exceeds 99.6%,
(viii) put rotary furnace filled with nitrogen for heating treatment with the oxygen content in the furnace lower than 0.4 vol %, the temperature for heating the furnace is controlled at 300° C., the heating treatment time is set at 90 minutes,
(ix) put the fly ash into the hermetic heating device filled with nitrogen for heating treatment, with the oxygen content in the furnace is lower than 0.4 vol %, the nitrogen in the furnace is over 99.6%, the temperature for heating the furnace controlled at 550° C., the heating treatment time is set as 25 minutes,
(x) put the fly ash into the hermetic heating device filled with nitrogen for heating treatment, with the oxygen content in the furnace is lower than 0.4 vol %, the hydrogen in the furnace is over 99.6%, the temperature for heating the furnace controlled at 380° C., the heating treatment time is set as 60 minutes,
(xi) put the fly ash into the hermetic heating device filled with nitrogen for heating treatment, with the oxygen content in the furnace is lower than 0.4 vol %, the hydrogen in the furnace is over 99.6%, the temperature for heating the furnace controlled at 450° C., the heating treatment time is set as 45 minutes,
(xi) put the fly ash into the hermetic heating device filled with nitrogen for heating treatment, with the oxygen content in the furnace is lower than 0.4 vol %, the hydrogen in the furnace is over 99.6%, the temperature for heating the furnace controlled at 450° C., the heating treatment time is set as 45 minutes,
(xii) put the fly ash into the hermetic heating device filled with nitrogen for heating treatment, with the oxygen content in the furnace is lower than 0.4 vol %, the hydrogen in the furnace is over 99.6%, the temperature for heating the furnace controlled at 500° C., the heating treatment time is set as 35 minutes,
(xiii) put the fly ash into the hermetic heating device filled with nitrogen for heating treatment, with the oxygen content in the furnace is lower than 0.4 vol %, the hydrogen in the furnace is over 99.6%, the temperature for heating the furnace controlled at 300° C., the heating treatment time is set as 80 minutes,
(xiv) put the fly ash into the hermetic heating device filled with nitrogen for heating treatment, with the oxygen content in the furnace is lower than 0.4 vol %, the hydrogen in the furnace is over 99.6%, the temperature for heating the furnace controlled at 480° C., the heating treatment time is set as 40 minutes; and
d. lower an environmental temperature in the hermetic heating device to between 180° C.-200° C. and transporting an exhaust gas produced in said hermetic heating device to a boiler of said waste incineration power plant resulting in the reduction of dioxin in the fly ash.

* * * * *